United States Patent
Aghili et al.

(10) Patent No.: US 10,337,463 B2
(45) Date of Patent: Jul. 2, 2019

(54) SYSTEMS AND METHODS FOR FUEL TANK PRESSURE CONTROL

(71) Applicant: Ford Global Technologies, LLC, Dearborn, MI (US)

(72) Inventors: Mohammad R. Aghili, Dearborn, MI (US); Aed M. Dudar, Canton, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 923 days.

(21) Appl. No.: 14/920,541

(22) Filed: Oct. 22, 2015

(65) Prior Publication Data

US 2017/0114733 A1   Apr. 27, 2017

(51) Int. Cl.
*F02D 41/00* (2006.01)
*F02D 41/04* (2006.01)
*F02M 25/08* (2006.01)

(52) U.S. Cl.
CPC ..... *F02M 25/0836* (2013.01); *F02D 41/0032* (2013.01); *F02M 25/0854* (2013.01); *F02D 41/042* (2013.01)

(58) Field of Classification Search
CPC ............ F02M 25/0836; F02M 25/0854; F02D 41/0032; F02D 41/042
See application file for complete search history.

(56) References Cited

U.S. PATENT DOCUMENTS

| | | |
|---|---|---|
| 8,353,273 B2 | 1/2013 | Mc Lain et al. |
| 8,560,167 B2 | 10/2013 | Jentz et al. |
| 2012/0211087 A1* | 8/2012 | Dudar ............... F02D 41/0032 137/12 |
| 2014/0026866 A1* | 1/2014 | Pifher .................. F02M 33/02 123/520 |
| 2014/0130781 A1* | 5/2014 | Jentz .................. F02M 25/0809 123/520 |
| 2014/0216421 A1* | 8/2014 | Pifher ............... F02M 25/0854 123/520 |
| 2014/0257668 A1* | 9/2014 | Jentz .................. F02M 25/0809 701/102 |
| 2015/0068498 A1 | 3/2015 | Peters et al. |
| 2015/0308389 A1* | 10/2015 | Bolger ............... F02M 25/0836 123/519 |
| 2015/0369151 A1 | 12/2015 | Dudar |
| 2016/0069303 A1* | 3/2016 | Pursifull ........... F02M 25/0836 701/103 |
| 2016/0290286 A1* | 10/2016 | Dudar ................ F02M 25/0836 |
| 2016/0326989 A1* | 11/2016 | Lahaye ............... F02N 11/0829 |
| 2017/0037806 A1* | 2/2017 | Dudar ................... F02D 41/222 |
| 2017/0045019 A1* | 2/2017 | Dudar ............... F02M 25/0836 |
| 2017/0218885 A1* | 8/2017 | Dudar ............... F02M 25/0809 |

* cited by examiner

*Primary Examiner* — Hieu T Vo (74) *Attorney, Agent, or Firm* — Julia Voutyras; McCoy Russell LLP (57) ABSTRACT

A method is presented wherein during a first condition that includes a fuel tank pressure above a threshold, a fuel tank is fluidically coupled to a fuel vapor canister while a fuel vapor canister vent path is restricted, and a degree of restriction of the fuel vapor canister vent path is modulated. Modulating the degree of restriction of the fuel vapor canister vent path allows a fuel tank to be depressurized at a controlled rate. In this way, excess fuel tank pressure can be relieved, even if a vehicle engine is not operating in a combustion mode.

20 Claims, 5 Drawing Sheets

SYSTEMS AND METHODS FOR FUEL TANK PRESSURE CONTROL

FIELD

The present description relates generally to methods and systems for controlling a vehicle fuel system to depressurize a fuel tank.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel. For hybrid vehicles, other vehicles with limited engine run time, or other vehicles configured to operate with minimal intake manifold vacuum, opportunities to purge a fuel vapor canister to intake may be limited. In Non-Integrated refueling canister only systems (NIRCOS), the fuel tank is typically sealed via a closed FTIV except during refueling operations.

However, the fuel tank may periodically be subject to significant pressure differentials, either positive pressure or vacuum. In order to maintain the integrity of the fuel tank and fuel system, as well as to allow for predictable fuel tank depressurization times prior to refueling, the fuel tank may be instructed to vent excess pressure from fuel vapor. While the vented fuel vapor may be adsorbed by the fuel vapor canister, at extreme pressures, opening the fuel tank isolation valve may overwhelm the canister, causing fuel vapor to be released. Typically, such a fuel tank venting event is performed while the engine is running, so that unbound fuel vapor can be directed to the engine intake for combustion, and/or the fuel vapor canister can be purged of its contents. However, if the engine is not running, fuel vapor may be released as evaporative emissions during a fuel tank venting event.

Other attempts to address fuel tank depressurization include providing both a refueling valve and a tank pressure control valve between the fuel tank and fuel vapor canister. One example approach is shown by Peters et al. in U.S. Patent Application 2015/0068498. Therein, a tank pressure control valve is provided with a smaller orifice than for the refueling valve, and is used to reduce fuel tank pressure during engine-on operations.

However, the inventors herein have recognized potential issues with such systems. As one example, for hybrid vehicles, venting the fuel tank in this manner cannot be performed during engine-off vehicle operation, as undesired emissions may occur. Further, the use of multiple valves and conduits adds system cost and complexity, requiring additional diagnostic tests.

In one example, the issues described above may be addressed by a method for a fuel system. During a first condition that includes a fuel tank pressure above a threshold, a fuel tank is fluidically coupled to a fuel vapor canister while a fuel vapor canister vent path is restricted, and a degree of restriction of the fuel vapor canister vent path is modulated. Modulating the degree of restriction of the fuel vapor canister vent path allows a fuel tank to be depressurized at a controlled rate. In this way, excess fuel tank pressure can be relieved, even if a vehicle engine is not operating in a combustion mode.

As one example, modulating the degree of restriction of the fuel vapor canister vent path may include adjusting a position of a changeover valve within an evaporative leak check module coupled within the fuel vapor canister vent path. In this way, existing components can be used to depressurize the fuel tank in a controlled fashion, and a canister purge valve may be maintained closed during fuel tank venting, thereby enabling engine-off fuel tank depressurization.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
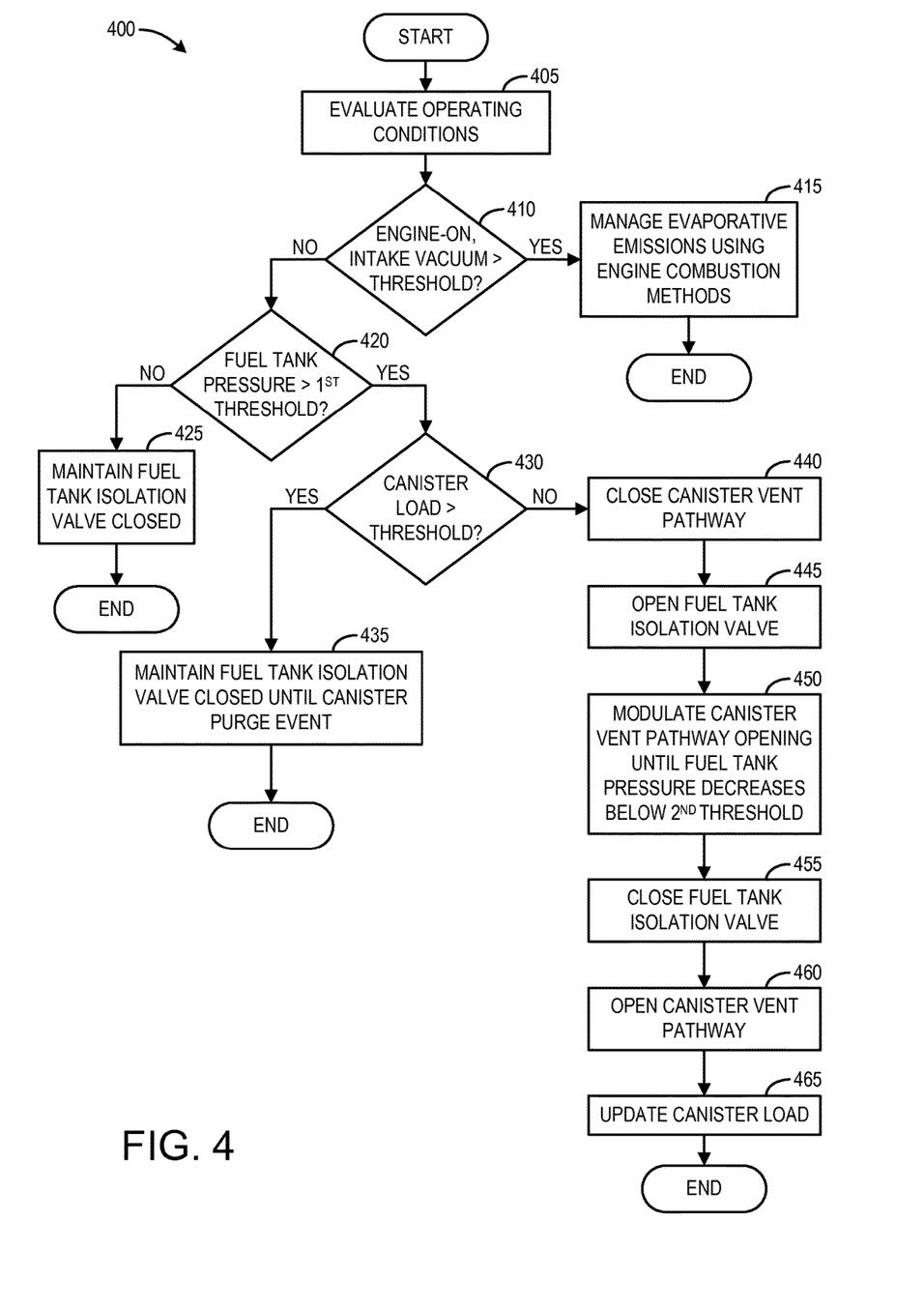
FIG. 4 shows an example method for depressurizing a fuel tank during engine-off vehicle operations.
Figure 5:
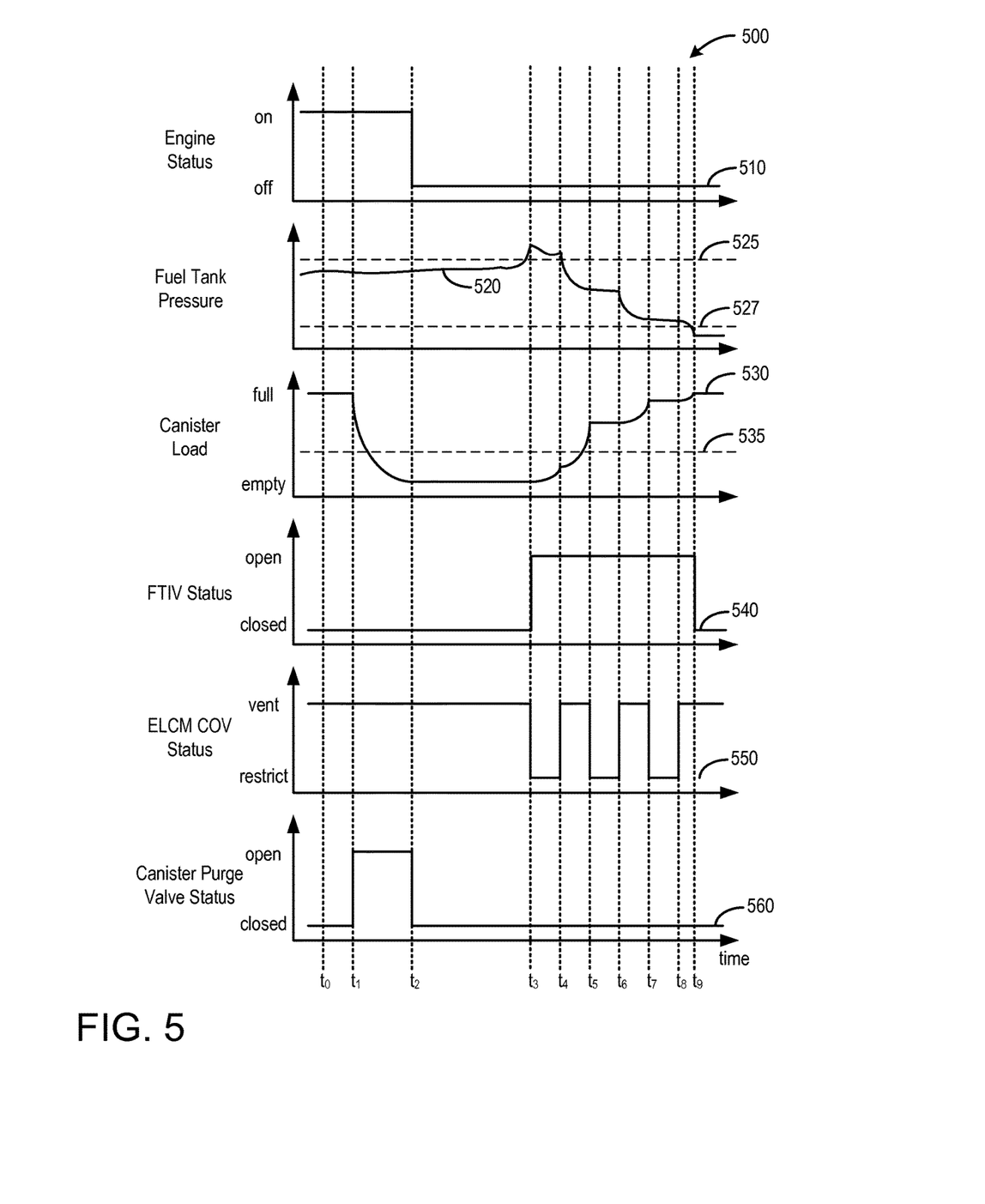
FIG. 5 shows a timeline for an example fuel tank depressurization event.

The following description relates to systems and methods for depressurizing a fuel tank. In particular, the description relates to depressurizing the fuel tank of a hybrid vehicle, such as the hybrid vehicle depicted in FIG. 1, during vehicle operation including an engine-off condition. The fuel tank may be coupled to a fuel vapor canister via a fuel tank isolation valve, as shown in the fuel system of FIG. 2. In many hybrid vehicles, the fuel tank is only vented during refueling events. However, excess fuel tank pressure may damage the fuel tank, and/or result in an extended fuel tank depressurization period prior to refueling. However, opening the fuel tank isolation valve to relieve excess fuel tank pressure may overwhelm the fuel vapor canister, leading to the release of unbound hydrocarbons. If the vehicle is operating with the engine off, or with minimal intake vacuum, the unbound hydrocarbons will not be combusted by the engine, leading to undesired evaporative emissions. In order to control the rate of fuel tank depressurization, the canister vent pathway may be restricted. For example, a canister vent pathway may include a canister vent valve that can be selectively opened and closed, and/or an evaporative leak check module, such as the evaporative leak check module shown in FIGS. 3A-3D which can be placed in an unrestricted vent conformation (FIG. 3C) or a restricted vent conformation (FIG. 3D) wherein the fuel vapor canister is coupled to atmosphere via an inactive vacuum pump. A method for controlled fuel tank depressurization is shown in FIG. 4, wherein a canister vent pathway is modulated during fuel tank depressurization. A timeline for an example fuel tank depressurization event is depicted in FIG. 5.

Figure 1:
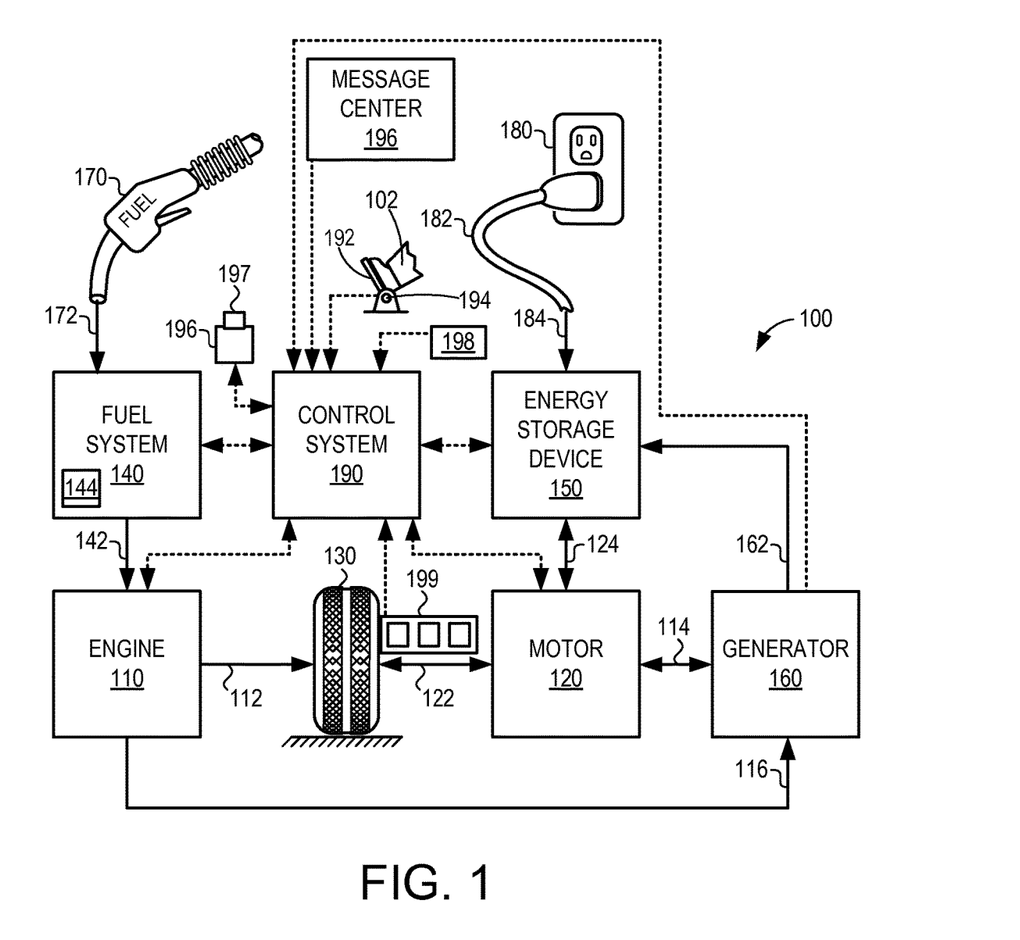
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
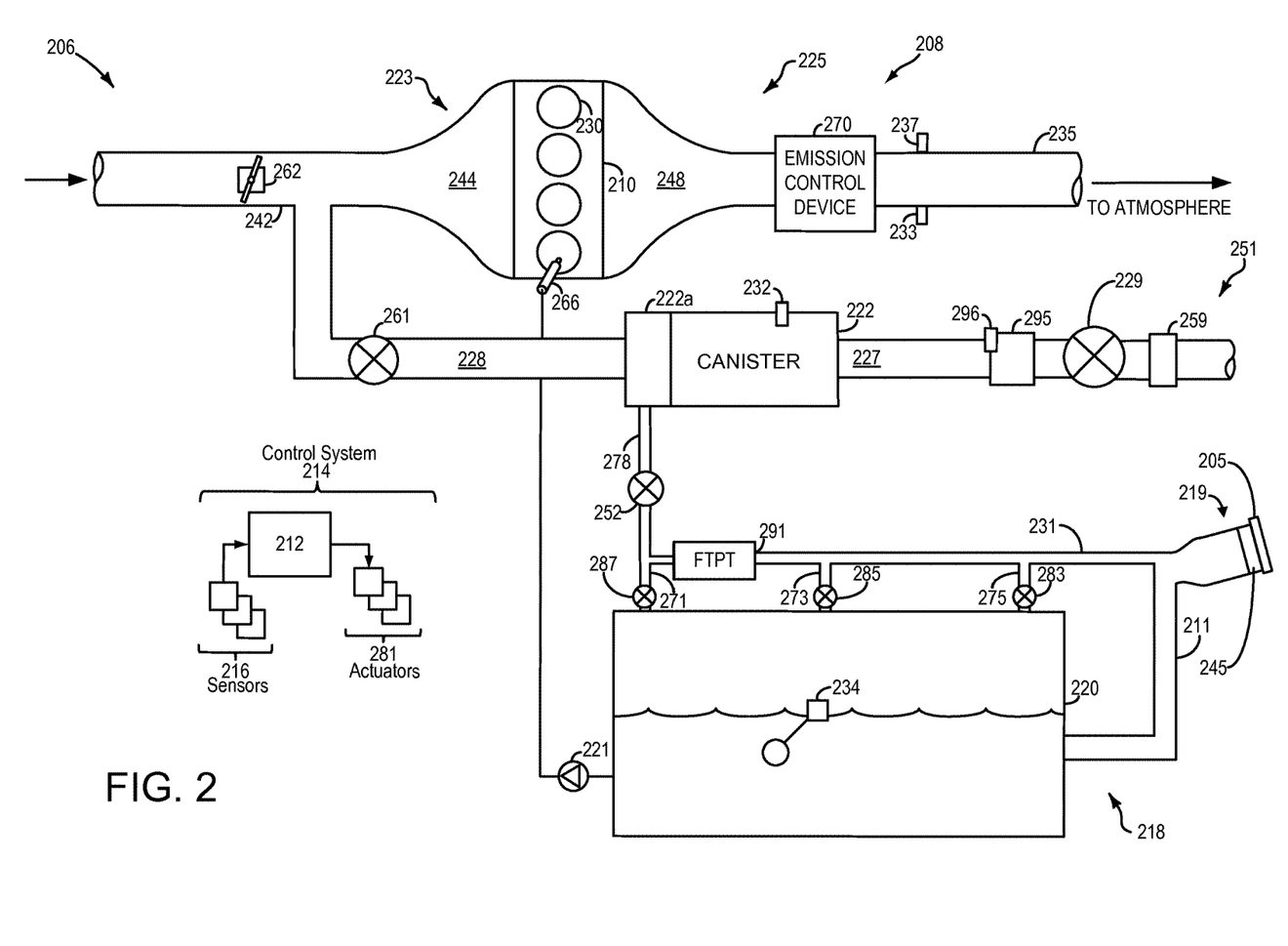
FIG. 2 schematically shows an example vehicle system comprising an engine system coupled to a fuel system and an evaporative emissions system.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits 278 and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves are provided in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). Based on a fuel level in the fuel tank 220, the vent valves may be open or closed. For example, GVV 287 may be normally open allowing for diurnal and "running loss" vapors from the fuel tank to be released into canister 222, preventing over-pressurizing of the fuel tank. However, during vehicle operation on an incline, when a fuel level as indicated by fuel level indicator 34 is artificially raised on one side of the fuel tank, GVV 287 may close to prevent liquid fuel from entering vapor recovery line 231. As another example, FLVV 285 may be normally open, however during fuel tank refilling, FLVV 285 may close, causing pressure to build in vapor recovery line 231 as well as at a filler nozzle coupled to the fuel pump. The increase in pressure at the filler nozzle may then trip the refueling pump, stopping the fuel fill process automatically, and preventing overfilling.

Further, in some examples, vapor recovery line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe or neck 211. Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere via canister vent valve 229, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 and canister vent valve 229 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 and canister vent valve 229, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 and canister vent valve 229 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure sensor 291, fuel level sensor 234, and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, ELCM 295, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with reference to FIG. 4.

Undesired evaporative emission detection routines may be intermittently performed by controller 212 on fuel system 218 to confirm that the fuel system is not degraded. As such, undesired evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by an evaporative leak check module (ELCM) 295 communicatively coupled to controller 212. ELCM 295 may be coupled in vent 227, between canister 222 and the atmosphere. ELCM 295 may include a vacuum pump configured to apply a negative pressure to the fuel system when in a first conformation, such as when administering a leak test. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation.

Figure 3A:
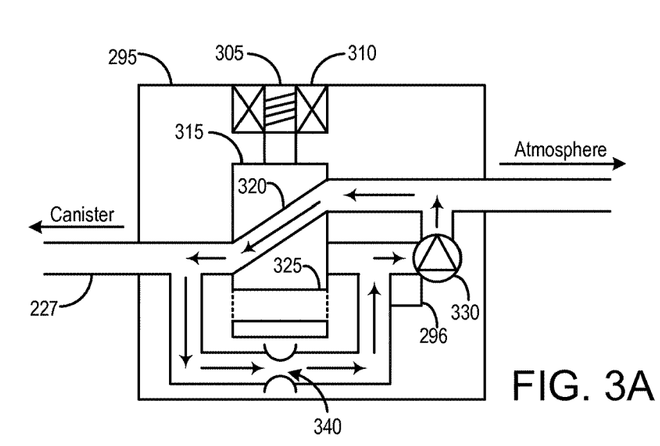
FIG. 3A shows a schematic depiction of an evaporative leak check module in a configuration to apply a vacuum to a reference orifice.
Figure 3B:
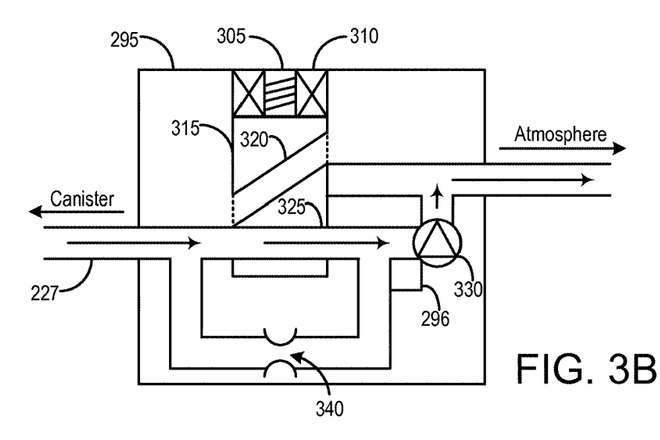
FIG. 3B shows a schematic depiction of an evaporative leak check module in a configuration to apply a vacuum to an evaporative emissions system.
Figure 3C:
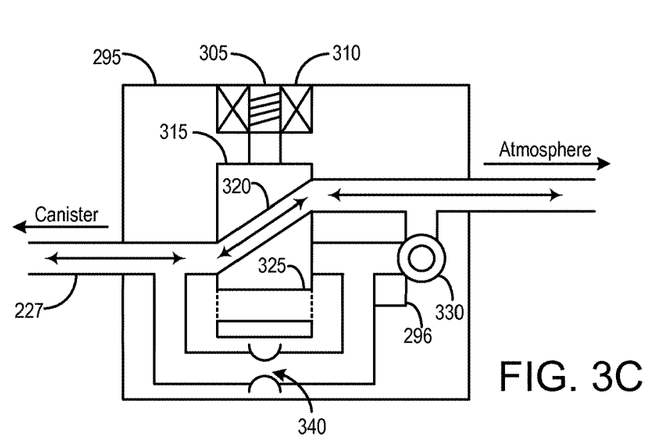
FIG. 3C shows a schematic depiction of an evaporative leak check module in a configuration where a fuel vapor canister is vented to atmosphere.
Figure 3D:
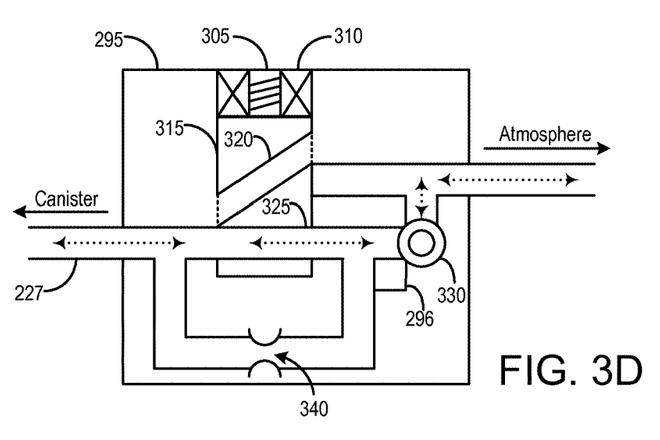
FIG. 3D shows a schematic depiction of an evaporative leak check module in a configuration where a fuel vapor canister is coupled to atmosphere via an inactive vacuum pump.

FIGS. 3A-3D show a schematic depiction of an example ELCM 295 in various conditions and conformations in accordance with the present disclosure. As shown in FIG. 2, ELCM 295 may be located along vent 227 between canister 222 and atmosphere. ELCM 295 includes a changeover valve (COV) 315, a vacuum pump 330, and a pressure sensor 296. Vacuum pump 330 may be a reversible pump, for example, a vane pump. COV 315 may be moveable between a first a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold leak to be tested, for example, 0.02". In either the first or second position, pressure sensor 296 may generate a pressure signal reflecting the pressure within ELCM 295. Operation of pump 330 and solenoid 310 may be controlled via signals received from controller 212.

As shown in FIG. 3A, COV 315 is in the first position, and pump 330 is activated in a first direction. In this conformation, ELCM 295 may perform a reference check. For example, fuel tank isolation valve 252 (not shown) may be closed, isolating ELCM 295 from the fuel tank. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for passing/failing a subsequent undesired evaporative emissions test.

As shown in FIG. 3B, COV 315 is in the second position, and pump 330 is activated in the first direction. This configuration allows pump 330 to draw a vacuum on fuel system 218 via vent line 227. In examples where fuel system 218 includes FTIV 252, FTIV 252 may be opened to allow pump 330 to draw a vacuum on fuel tank 220. Air flow through ELCM 295 in this configuration is represented by arrows. In this configuration, as pump 330 pulls a vacuum on fuel system 218, the absence of undesired evaporative emissions from the system should allow for the vacuum level in ELCM 295 to reach or exceed the previously determined vacuum threshold using reference orifice 340. In the presence of an evaporative emissions system breach larger than the reference orifice, the pump will not pull down to the reference check vacuum level, and undesired evaporative emissions may be indicated.

As shown in FIG. 3C, COV 315 is in the first position, and pump 330 is deactivated. This configuration allows for air to freely flow between atmosphere and the canister via first flow path 320. This configuration may be used during a canister purging operation, for example, or during other conditions where the fuel vapor canister is to be vented to atmosphere.

As shown in FIG. 3D, COV 315 is in the second position, and pump 330 is deactivated. This configuration allows for air to flow in a restricted manner between atmosphere and the canister via second flow path 325. Air flow between atmosphere and the canister is directed through the deactivated pump. A pressure gradient may cause the vanes of the pump to rotate, leaking air down the gradient. As described further herein and with regards to FIGS. 4 and 5, in some embodiments, this configuration may be used during a controlled fuel tank depressurization.

For hybrid vehicles, other vehicles with limited engine run time, or other vehicles configured to operate with minimal intake manifold vacuum, opportunities to purge a fuel vapor canister to intake may be limited. In Non-Integrated refueling canister only systems (NIRCOS), the fuel tank is typically sealed via a closed FTIV except during refueling operations, including fuel tank depressurization routines prior to refueling. However, the fuel tank may periodically be subject to significant pressure differentials, either positive pressure or vacuum. In order to maintain the integrity of the fuel tank and fuel system, as well as to allow for predictable fuel tank depressurization times prior to refueling, the fuel tank may be instructed to vent excess pressure from fuel vapor. While the vented fuel vapor may be adsorbed by the fuel vapor canister, at extreme pressures, opening the fuel tank isolation valve may overwhelm the canister, causing fuel vapor to be released. Typically, such a fuel tank venting event is performed while the engine is running, so that unbound fuel vapor can be directed to the engine intake for combustion, and/or the fuel vapor canister can be purged of its contents. However, if the engine is not running, fuel vapor may be released as evaporative emissions during a fuel tank venting event.

FIG. 4 depicts a flow chart for a high level method 400 for depressurizing a fuel tank during engine-off vehicle operations. In particular, method 400 enables controlled depressurization by modulating the flow of gasses stripped of fuel vapor out of a canister vent pathway. Instructions for carrying out method 400 and other methods included herein may be executed by a controller based on instructions stored in non-transitory memory of the controller, and in conjunction with signals received from sensors of the evaporative emissions system, such as the sensors described above with reference to FIG. 2. The controller may employ actuators of the evaporative emissions system to adjust evaporative emissions system operation, according to the methods described below. While described with reference to the systems depicted in FIGS. 1-3, it should be understood that method 400 or similar methods may be applied to other systems without departing from the scope of this disclosure.

Method 400 may begin at 405 by evaluating engine operating conditions. Engine operating conditions may be measured, estimated or inferred, and may include various vehicle conditions, such as vehicle speed, various engine operating conditions, such as engine operating mode, engine speed, engine temperature, exhaust temperature, fuel tank fill level, fuel tank pressure, etc., as well as various ambient conditions, such as ambient temperature, humidity, barometric pressure, etc.

Continuing at 410, method 400 includes determining whether the vehicle engine is on and whether the intake manifold vacuum is above a threshold, such as the threshold for purging a fuel vapor canister. If the vehicle engine is on, and the intake vacuum is above the threshold, method 400 proceeds to 415. At 415, method 400 includes managing evaporative emissions using engine combustion methods. For example, fuel vapor canister purging and fuel tank venting may be performed based on the combustion of released fuel vapors by the vehicle engine. Method 400 may then end.

If the vehicle engine is not on (e.g., vehicle is off, vehicle is operating in battery-only mode), or the intake vacuum is less than the threshold (e.g., engine and battery operation) method 400 proceeds to 420. At 420, method 400 includes determining whether the fuel tank pressure is greater than a first threshold. Fuel tank pressure may be determined through a pressure sensor coupled within the fuel tank (e.g., FTPT 291), or may be inferred based on other available data. The first threshold may be predetermined and/or may be based on operating conditions. For example, the first threshold may be a recommended maximum fuel tank pressure. In some examples, the first threshold may be based on a fuel level. For example, if a fuel level is below a threshold, indicating that a refueling event is imminent, the first threshold may be based on a maximum fuel tank depressurization time and/or rate prior to allowing refueling to occur.

If the fuel tank pressure is not greater than the first threshold, method 400 proceeds to 425. At 425, method 400 includes maintaining the fuel tank isolation valve closed. Method 400 may then end. If the fuel tank pressure is greater than the first threshold, method 400 proceeds to 430, and includes determining whether the fuel vapor canister load is greater than a threshold. Fuel vapor canister load may be measured, estimated, or inferred. For example, canister loading following a canister purge event may be estimated based on changes in canister temperature during fuel tank venting events. Canister purging amounts may be estimated based on changes in canister temperature, measurements from hydrocarbon sensors, oxygen sensors, etc. The canister load threshold may be predetermined, or may be based on an estimated amount of fuel vapor expected to be vented, which may be based on the fuel tank pressure and fuel tank fill level. In other words, it may be determined whether the fuel vapor canister has sufficient capacity to adsorb fuel vapor if the fuel tank is vented under the current operating conditions.

If the canister load is above the threshold, method 400 proceeds to 435, and includes maintaining the fuel tank isolation valve closed until a canister purge event reduces the canister load. Additionally or alternatively, if the vehicle operating conditions indicate that purging conditions are met, the fuel tank isolation valve may be opened to reduce the fuel tank pressure whether the canister has been purged or not.

If the canister load is below the threshold, method 400 proceeds to 440, and includes closing the canister vent pathway. In some examples, this may include closing a canister vent valve, such as canister vent valve 229. In other examples, this may include placing an ELCM COV in a position where the fuel vapor canister is coupled to atmosphere via the ELCM vacuum pump while maintaining the ELCM vacuum pump in a deactivated state, as shown in FIG. 3D, for example.

Continuing at 445, method 400 includes opening a fuel tank isolation valve, or otherwise coupling the fuel tank to the fuel vapor canister. Further, the canister vent pathway may be maintained closed, and a canister purge valve may be remained closed. In this conformation, fuel vapor may be vented from the fuel tank into the fuel vapor canister, however, as the fuel vapor canister vent is restricted, the amount of fuel vapor traversing the adsorbent bed is limited by the volume contained in the fuel vapor canister, and in any conduits between the fuel tank isolation valve and the canister vent pathway restriction.

Continuing at 450, method 400 includes modulating the canister vent pathway opening until the fuel tank pressure decreases below a second threshold, less than the first threshold. In some examples, the second threshold may be atmospheric pressure. The second threshold may be predetermined, may be based on the original fuel tank pressure, may be based on a desired rate of fuel tank depressurization prior to a refueling event, etc.

Modulating the canister vent pathway may include adjusting the position of an ELCM COV between a restricted flow position (see FIG. 3D) and an unrestricted flow position (see FIG. 3C). The COV may be modulated between the restricted flow and unrestricted flow positions to reduce the fuel tank pressure in a step-wise fashion. Similarly, modulating the canister vent pathway may include adjusting the position of a canister vent valve between a closed and open position. In some example, a canister vent valve duty cycle may be gradually increased (e.g. from 5% duty cycle to 10% duty cycle to 15% duty cycle, etc.). The rate of modulation and/or duty cycle may be based on a desired fuel tank depressurization rate. In some examples, wherein the canister vent pathway includes both an ELCM and a canister vent valve (as shown in FIG. 2), the ELCM COV position may be adjusted while the canister vent valve is opened at a duty cycle less than 100% duty cycle, thereby restricting the amount of vapor flow even in the configuration where the ELCM COV is in the unrestricted flow position.

When the fuel tank pressure has been decreased below the second threshold, method 400 proceeds to 455, and includes closing the fuel tank isolation valve. Continuing at 460, method 400 includes opening the canister vent pathway. This may include opening a canister vent valve at 100% duty cycle and/or placing an ELCM COV in an unrestricted flow position.

Continuing at 465, method 400 includes updating a fuel vapor canister load. The fuel vapor canister load may be updated based on a fuel vapor canister temperature change over the fuel tank venting event, based on a fuel tank pressure change and/or rate of change over the fuel tank venting event, based on the outputs of relevant hydrocarbon and/or oxygen sensors, etc. Method 400 may further include updating a fuel vapor canister purge schedule based on the updated canister load, updating fuel system undesired evaporative emissions tests, etc. Method 400 may then end.

FIG. 5 depicts a timeline 500 for an example fuel tank depressurization event during an engine-off condition using the method described herein and with reference to FIG. 4. Timeline 500 includes plot 510, indicating an engine status over time, and plot 520, indicating a fuel tank pressure over time. Line 525 represents a first fuel tank pressure threshold, while line 527 represents a second fuel tank pressure threshold. Timeline 500 further includes plot 530, indicating a canister load over time. Line 535 represents a canister load threshold for venting a fuel tank. Timeline 500 further includes plot 540, indicating FTIV status over time, plot 550, indicating an ELCM COV status over time, and plot 560, indicating a canister purge valve status over time.

At time $t_0$, the engine is on, as shown by plot 510. As shown by plot 520, the fuel tank pressure is below the threshold for venting represented by line 525. The fuel vapor canister is saturated, as shown by plot 530. The FTIV is open, the ELCM COV is in a venting position, and the canister purge valve is closed, as shown by plots 540, 550, and 560, respectively.

At time $t_1$, a canister purge event is initiated as the canister purge valve is opened. Accordingly, the fuel vapor canister load decreases. At time $t_2$, the canister purge valve is closed, and the engine is shut off. At time $t_3$, the fuel tank pressure increases above the threshold represented by line 525. The engine is off, and the fuel vapor canister load is below the threshold represented by line 535. Accordingly, a fuel tank venting event may be initiated. The ELCM COV is placed in a restricting position and the FTIV is opened. Accordingly, the fuel tank pressure decreases slightly, and the canister load increases slightly.

From time $t_4$ to time $t_5$, the ELCM COV is placed in a venting position while the FTIV is maintained open. In this conformation, the fuel tank pressure decreases, while the canister load increases. From time $t_5$ to time $t_6$, the ELCM COV is placed in a restricting position while the FTIV is maintained open. In this conformation, the fuel tank pressure may decrease slightly, and the canister load may increase slightly as gasses stripped of fuel vapor are forced to atmosphere through the ELCM pump.

From time $t_6$ to time $t_7$, the ELCM COV is again placed in a venting position while the FTIV is maintained open, further decreasing the fuel tank pressure and increasing the canister load. From time $t_7$ to time $t_8$, the ELCM COV is again placed in a restricting position while the FTIV is maintained open, thereby reducing gas flow through the canister vent path.

At time $t_8$, the ELCM COV is again placed in a venting position. At time $t_9$, the fuel tank pressure decreases to the second fuel tank pressure represented by line 527. Accordingly, the FTIV is closed, and the ELCM COV is maintained in the venting position.

The systems described herein and with reference to FIGS. 1, 2, and 3A-3D, along with the methods described herein and with reference to FIG. 4 may enable one or more systems and one or more methods. In one example, a method is presented, comprising: during a first condition, including a fuel tank pressure above a first threshold, fluidically coupling a fuel tank to a fuel vapor canister while restricting a fuel vapor canister vent path; and modulating a degree of restriction of the fuel vapor canister vent path. In such an example, the method may additionally or alternatively comprise: responsive to a fuel tank pressure decreasing below a second threshold, lower than the first threshold, sealing the fuel tank from the fuel vapor canister; and removing restrictions from the fuel vapor canister vent path. In any of the preceding examples, restricting a fuel vapor canister vent path may additionally or alternatively include closing a canister vent valve coupled within the fuel vapor canister vent path. In any of the preceding examples, modulating a degree of restriction of the fuel vapor canister vent path may additionally or alternatively include adaptively adjusting a duty cycle of the canister vent valve. In any of the preceding examples, modulating a degree of restriction of the fuel vapor canister vent path may additionally or alternatively include modulating the canister vent valve between a closed conformation and an open conformation. In any of the preceding examples, removing restrictions from the fuel vapor canister vent path may additionally or alternatively include opening the canister vent valve. In any of the preceding examples, restricting a fuel vapor canister vent path may additionally or alternatively include placing a changeover valve of an evaporative leak check module in a restricted flow position. In any of the preceding examples, modulating a degree of restriction of the fuel vapor canister vent path may additionally or alternatively include modulating a position of the changeover valve between a restricted flow position and an unrestricted flow position. In any of the preceding examples, placing a changeover valve of an evaporative leak check module in a restricted flow position may additionally or alternatively include placing the changeover valve in a position where the fuel vapor canister is coupled to atmosphere via an evaporative leak check module vacuum pump. In any of the preceding examples, placing a changeover valve of an evaporative leak check module in a restricted flow position further may additionally or alternatively include maintaining the evaporative leak check module vacuum pump in a deactivated state. In any of the preceding examples, the first condition may additionally or alternatively include an engine-off condition. In any of the preceding examples, the first condition may additionally or alternatively include a vehicle-on condition. In any of the preceding examples, the first condition may additionally or alternatively include an intake manifold vacuum below a threshold. The technical result of implementing such a method is a reduction in undesired evaporative emissions, as fuel tank pressure can be managed during engine-off conditions, thereby decreasing the likelihood of fuel tank breaching due to excessive fuel tank pressure.

In another example, a fuel system for a vehicle is presented, comprising: a fuel tank coupled to a fuel vapor canister via a fuel tank isolation valve; a fuel tank pressure sensor coupled to the fuel tank; a canister vent valve coupled between the fuel vapor canister and atmosphere; and a controller comprising instructions stored in non-transitory memory, that when executed, cause the controller to: during a first condition, including an engine-off condition and a fuel tank pressure above a first threshold, closing the canister vent valve; opening the fuel tank isolation valve; and adaptively modulating a duty cycle of the canister vent valve. In such an example fuel system, the controller may additionally or alternatively be configured with instructions stored in non-transitory memory, that when executed, cause the controller to: closing the fuel tank isolation valve responsive to a fuel tank pressure decreasing below a second threshold, lower than the first threshold; and opening the canister vent valve. In any of the preceding example, adaptively modulating a duty cycle of the canister vent valve may additionally or alternatively include modulating the canister vent valve between a closed conformation and an open conformation. The technical result of implementing this fuel system is a reduction in manufacturing costs and complexity, as existing componentry can be used to depressurize a fuel tank of a hybrid vehicle.

In yet another example, an evaporative emissions system for a vehicle is presented, comprising: a fuel tank coupled to a fuel vapor canister via a fuel tank isolation valve; a fuel tank pressure sensor coupled to the fuel tank; an evaporative leak check module coupled between the fuel vapor canister and atmosphere, the evaporative leak check module adjustable between a first, unrestricted vent conformation and a second, restricted vent conformation; and a controller comprising instructions stored in non-transitory memory, that when executed, cause the controller to: during a first condition, including an engine-off condition and a fuel tank pressure above a first threshold, placing the evaporative leak check module in the second, restricted vent conformation; opening the fuel tank isolation valve; and modulating the evaporative leak check module between the first, unrestricted vent conformation, and the second, restricted vent conformation. In such an example, the controller may additionally or alternatively be configured with instructions stored in non-transitory memory, that when executed, cause the controller to: closing the fuel tank isolation valve responsive to a fuel tank pressure decreasing below a second threshold, lower than the first threshold; and placing the evaporative leak check module in the first, unrestricted vent conformation. In any of the preceding examples, modulating the evaporative leak check module between the first, unrestricted vent conformation, and the second, restricted vent conformation may additionally or alternatively comprise adjusting a position of a changeover valve. In any of the preceding examples, the second restricted vent conformation may additionally or alternatively include a vent path comprising a deactivated vacuum pump. The technical result of implementing this evaporative emissions system is an increase in fuel tank life, as excessive pressures within the fuel tank can be relieved regardless of the engine operating conditions, thereby reducing emissions and warranty costs over the life of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
during a first condition, including a fuel tank pressure above a first threshold, fluidically coupling a fuel tank to a fuel vapor canister while restricting a fuel vapor canister vent path; and
modulating a degree of restriction of the fuel vapor canister vent path.

2. The method of claim 1, further comprising:
responsive to a fuel tank pressure decreasing below a second threshold, lower than the first threshold, sealing the fuel tank from the fuel vapor canister; and
removing restrictions from the fuel vapor canister vent path.

3. The method of claim 1, wherein restricting the fuel vapor canister vent path includes closing a canister vent valve coupled within the fuel vapor canister vent path.

4. The method of claim 3, wherein modulating a degree of restriction of the fuel vapor canister vent path includes adaptively adjusting a duty cycle of the canister vent valve.

5. The method of claim 4, wherein modulating the degree of restriction of the fuel vapor canister vent path includes modulating the canister vent valve between a closed conformation and an open conformation.

6. The method of claim 2, wherein removing restrictions from the fuel vapor canister vent path includes opening a canister vent valve.

7. The method of claim 1, wherein restricting the fuel vapor canister vent path includes placing a changeover valve of an evaporative leak check module in a restricted flow position.

8. The method of claim 7, wherein modulating a degree of restriction of the fuel vapor canister vent path includes modulating a position of the changeover valve between the restricted flow position and an unrestricted flow position.

9. The method of claim 7, wherein placing the changeover valve of the evaporative leak check module in the restricted flow position includes placing the changeover valve in a position where the fuel vapor canister is coupled to atmosphere via an evaporative leak check module vacuum pump.

10. The method of claim 9, wherein placing the changeover valve of the evaporative leak check module in the restricted flow position further includes maintaining the evaporative leak check module vacuum pump in a deactivated state.

11. The method of claim 1, wherein the first condition includes an engine-off condition.

12. The method of claim 11, wherein the first condition includes a condition where a vehicle is operating in a battery-only mode.

13. The method of claim 1, wherein the first condition includes an intake manifold vacuum below a threshold.

14. A fuel system for a vehicle, comprising:
   a fuel tank coupled to a fuel vapor canister via a fuel tank isolation valve;
   a fuel tank pressure sensor coupled to the fuel tank;
   a canister vent valve coupled between the fuel vapor canister and atmosphere; and
   a controller comprising instructions stored in non-transitory memory, that when executed cause the controller to:
      during a first condition, including an engine-off condition and a fuel tank pressure above a first threshold, closing the canister vent valve;
      opening the fuel tank isolation valve; and
      adaptively modulating a duty cycle of the canister vent valve.

15. The fuel system of claim 14, wherein the controller is further configured with instructions stored in non-transitory memory, that when executed cause the controller to:
   close the fuel tank isolation valve responsive to a fuel tank pressure decreasing below a second threshold, lower than the first threshold; and
   open the canister vent valve.

16. The fuel system of claim 14, wherein adaptively modulating the duty cycle of the canister vent valve includes modulating the canister vent valve between a closed conformation and an open conformation.

17. An evaporative emissions system for a vehicle, comprising:
   a fuel tank coupled to a fuel vapor canister via a fuel tank isolation valve;
   a fuel tank pressure sensor coupled to the fuel tank;
   an evaporative leak check module coupled between the fuel vapor canister and atmosphere, the evaporative leak check module adjustable between a first, unrestricted vent conformation and a second, restricted vent conformation; and
   a controller comprising instructions stored in non-transitory memory, that when executed cause the controller to:
      during a first condition, including an engine-off condition and a fuel tank pressure above a first threshold, placing the evaporative leak check module in the second, restricted vent conformation;
      open the fuel tank isolation valve; and
      modulate the evaporative leak check module between the first, unrestricted vent conformation, and the second, restricted vent conformation.

18. The evaporative emissions system of claim 17, wherein the controller is further configured with instructions stored in non-transitory memory, that when executed cause the controller to:
   close the fuel tank isolation valve responsive to a fuel tank pressure decreasing below a second threshold, lower than the first threshold; and
   place the evaporative leak check module in the first, unrestricted vent conformation.

19. The evaporative emissions system of claim 17, wherein modulating the evaporative leak check module between the first, unrestricted vent conformation, and the second, restricted vent conformation includes adjusting a position of a changeover valve.

20. The evaporative emissions system of claim 17, wherein the second, restricted vent conformation includes a vent path comprising a deactivated vacuum pump.

* * * * *